United States Patent [19]

Kazmaier et al.

[11] Patent Number: 5,153,094

[45] Date of Patent: Oct. 6, 1992

[54] PROCESSES FOR THE PREPARATION OF PHOTOGENERATING PIGMENTS

[75] Inventors: Peter M. Kazmaier; James M. Duff; Gordon K. Hamer; Charles G. Allen, all of Mississauga; Sandra J. Gardner, Willowdale, all of Canada

[73] Assignee: Xerox Corporation, Stamford, Conn.

[21] Appl. No.: 537,740

[22] Filed: Jun. 14, 1990

[51] Int. Cl.$^5$ .............................................. G03G 5/06
[52] U.S. Cl. ..................................... 430/135; 430/58; 430/73; 430/76
[58] Field of Search ................. 430/59, 135, 58, 73, 430/76

[56] References Cited

U.S. PATENT DOCUMENTS

| | | | |
|---|---|---|---|
| 4,239,549 | 12/1980 | Fabian et al. | 106/308 R |
| 4,404,385 | 9/1983 | Babler | 524/90 |
| 4,451,654 | 5/1984 | Graser et al. | 546/34 |
| 4,508,650 | 4/1985 | Tokoli et al. | 260/245.86 |
| 4,725,518 | 2/1988 | Carmichael et al. | 430/59 |
| 4,771,133 | 9/1988 | Liebermann et al. | 540/143 |
| 4,898,799 | 2/1990 | Fujimaki et al. | 430/59 |

FOREIGN PATENT DOCUMENTS

| | | |
|---|---|---|
| 171771 | 8/1986 | Japan . |
| 256865 | 11/1987 | Japan . |
| 256866 | 11/1987 | Japan . |
| 256867 | 11/1987 | Japan . |
| 20365 | 1/1988 | Japan . |
| 6417066 | 1/1989 | Japan . |
| 1-20564 | 5/1989 | Japan . |

*Primary Examiner*—Marion E. McCamish
*Assistant Examiner*—Steve Rosasco
*Attorney, Agent, or Firm*—E. O. Palazzo

[57] ABSTRACT

A process which comprises adding a pigment to a solution of trihaloacetic acid and toluene; adding the solution to a nonsolvent for the pigment; and separating the product from the solution.

25 Claims, No Drawings

PROCESSES FOR THE PREPARATION OF PHOTOGENERATING PIGMENTS

BACKGROUND OF THE INVENTION

This invention is generally directed to processes for the preparation of photogenerating components, and more specifically the present invention is directed to processes for obtaining photogenerating pigments such as perylenes, perinones, and phthalocyanines, especially titanyl phthalocyanine, reference for example U.S. Pat. No. 4,898,799, the disclosure of which is totally incorporated herein by reference. In one embodiment, the present invention is directed to a process for the preparation of perylenes, perinones, and phthalocyanines, such as metal free phthalocyanines, metal phthalocyanines, vanadyl phthalocyanines, titanyl phthalocyanines and the like by initially providing, for example, the phthalocyanine, such as titanyl phthalocyanine, or accomplishing the preparation thereof by, for example, the reaction of titanium tetra(propoxide) with a mixture of phthalonitrile and diaminoisoindolene in a 1-methylpyrrolidinone solvent; dissolving the resulting polymorph in a solvent mixture of trifluoroacetic acid and toluene; and thereafter precipitating the desired photogenerating pigment by, for example, adding with stirring the aformentioned mixture to water, separating the product therefrom by, for example, filtration, and washing the product obtained. The photogenerating pigments obtained, which in one embodiment of the present invention are of small particle size diameter, such as, for example, from about 0.05 micron to about 1 micron, including titanyl phthalocyanines, especially the polymorph II, can be selected as organic photogenerator pigments in photoresponsive imaging members containing charge transport layers such as aryl amine hole transport molecules. The aforementioned photoresponsive imaging members can be negatively charged when the photogenerating layer is situated between the hole transport layer and the substrate; or positively charged when the hole transport layer is situated between the photogenerating layer and the supporting substrate. The layered photoconductor imaging members can be selected for a number of different known imaging and printing processes including, for example, electrophotographic imaging processes, especially xerographic processes wherein negatively charged or positively charged images are rendered visible with toner compositions of the appropriate charge. Generally, the imaging members are sensitive in the wavelength regions of from about 400 to about 800 nanometers, depending on the photogenerator selected, thus diode lasers can be selected as the light source for imaging members sensitive to wavelengths of from about 700 to about 800 nanometers.

Processes for the preparation of phthalocyanines, such as titanyl phthalocyanine, are known, however, many of them require the use of a strong acid such as sulfuric acid, and these processes are not easily scalable. One process as illustrated in Konica Japanese Laid Open on Jan. 20, 1989 as 64-17066, the disclosure of which is totally incorporated herein by reference, involves the reaction of titanium tetrachloride and phthalodinitrile in an alpha-chloronaphthalene solvent to produce dichlorotitanium phthalocyanine which is then subjected to hydroylsis by ammonia water to enable alpha-type phthalocyanine. This phthalocyanine is preferably treated with an electron releasing solvent such as 2-ethoxyethanol, dioxane, 1-methylpyrrolidinone, followed by subjecting the alpha-titanyl phthalocyanine to milling at a temperature of from 50° to 180° C. In a second method described in the aforementioned Japanese Publication, there is disclosed the preparation of alpha-type titanyl phthalocyanine with sulfuric acid. Another method for the preparatrion of alpha-titanyl phthalocyanine involves the addition of an aromatic hydrocarbon, such as dichlorobenzene, solvent to an aqueous suspension of the phthalocyanine, and heating. reference Japanese Laid Open 20365/1988, laid open Jan. 28, 1988. In Japanese 171771/1986, laid open Aug. 2, 1986, there is disclosed the purification of metalloxy phthalocyanine by treatment with 1-methylpyrrolidinone. Imaging members with the above prepared prior art phthalocyanines are also known.

Generally, layered photoresponsive imaging members are described in a number of U.S. patents, such as U.S. Pat. No. 4,265,900, the disclosure of which is totally incorporated herein by reference, wherein there is illustrated an imaging member comprised of a photogenerating layer, and an aryl amine hole transport layer. Examples of photogenerating layer components include trigonal selenium, metal phthalocyanines, vanadyl phthalocyanines, and metal free phthalocyanines. Additionally, there is described in U.S. Pat. No. 3,121,006 a composite xerographic photoconductive member comprised of finely divided particles of a photoconductive inorganic compound dispersed in an electrically insulating organic resin binder. The binder materials disclosed in the '006 patent comprise a material which is incapable of transporting for any significant distance injected charge carriers generated by the photoconductive particles.

Photoresponsive imaging members with squaraine photogenerating pigments are also known, reference U.S. Pat. No. 4,415,639. In this patent there is illustrated a photoresponsive imaging member with a substrate, a hole blocking layer, an optional adhesive interface layer, an organic photogenerating layer, a photoconductive composition capable of enhancing or reducing the intrinsic properties of the photogenerating layer, and a hole transport layer. As photoconductive compositions for the aforementioned member there can be selected various squaraine pigments, including hydroxy squaraine compositions. Moreover, there is disclosed in U.S. Pat. No. 3,824,099 certain photosensitive hydroxy squaraine compositions.

The use of selected perylene pigments as photoconductive substances is also known. There is thus described in Hoechst European Patent Publication 0040402, DE3019326, filed May 21, 1980, the use of N,N'-disubstituted perylene-3,4,9,10-tetracarboxyldiimide pigments as photoconductive substances. Specifically, there is disclosed in this publication evaporated N,N'-bis(3-methoxypropyl)-perylene-3,4,9,10-tetracarboxyldiimide dual layered negatively charged photoreceptors with improved spectral response in the wavelength region of 400 to 700 nanometers. A similar disclosure is revealed in Ernst Gunther Schlosser, Journal of Applied Photographic Engineering, Vol. 4, No. 3, page 118 (1978). There is also disclosed in U.S. Pat. No. 3,871,882 photoconductive substances comprised of specific perylene-3,4,9,10-tetracarboxylic acid derivative dyestuffs. In accordance with the teachings of this patent, the photoconductive layer is preferably formed by vapor depositing the dyestuff in a vacuum. Also, there is specifically disclosed in this patent dual layer photoreceptors with perylene-3,4,9,10-tetracarboxylic acid diimide derivatives, which have spectral response in the wavelength region of from 400 to 600 nanometers. Also, in U.S. Pat. No. 4,555,463, the disclosure of which is totally incorporated herein by reference, there is illustrated a layered imaging member with a chloroindinium phthalocyanine photogenerating layer. In U.S. Pat. No. 4,587,189, the disclosure of which is totally incorporated herein by reference there is illustrated a layered imaging member with a perylene pigment photgenerating component. Both of the afornementioned patents disclose an aryl amine component as a hole transport layer.

Moreover, there is disclosed in U.S. Pat. No. 4,419,427 electrographic recording media with a photosemiconductive double layer comprised of a first layer containing charge carrier perylene diimide producing dyes, and a second layer with one or more compounds which are charge transporting materials when exposed to light, reference the disclosure in column 2, beginning at line 20. Also of interest with respect to this patent is the background information included in columns 1 and 2, wherein perylene dyes of the formula illustrated are presented.

There is illustrated in U.S. Pat. No. 4,574,482, entitled Photoconductive Devices Containing Perylene Dye Compositions, the disclosure of which is totally incorporated herein by reference, an ambipolar imaging member comprised of a supporting substrate, a photoconductive layer comprised of specific perylene dyes different than the perylene pigments of the present invention, which dyes are dispersed in a polymeric resinous binder composition, and as a top layer a specific aryl amine hole transporting substance dispersed in an inactive resinous binder.

In copending application U.S. Ser. No. 537,714 (D/90087), the disclosure of which is totally incorporated herein by reference, there are illustrated photoresponsive imaging members with photogenerating titanyl phthalocyanine layers prepared by vacuum deposition. It is indicated in this copending application that the imaging members comprised of the vacuum deposited titanyl phthalocyanines and aryl amine hole transporting compounds exhibit superior xerographic performance as low dark decay characteristics result and higher photosensitivity is generated, particularly in comparison to several prior art imaging members prepared by solution coating or spray coating, reference for example U.S. Pat. No. 4,429,029 mentioned hereinbefore.

In copending application U.S. Ser. No. 533,261 (D/90198), the disclosure of which is totally incorporated herein by reference, there is disclosed, for example, a process for the preparation of titanyl phthalocyanine which comprises dissolving a titanyl phthalocyanine in a solution of trifluoroacetic acid and methylene chloride; adding the resultant solution to a solvent system that will enable precipitation; and separating the desired titanyl phthalocyanine from the solution followed by an optional washing.

In copending application U.S. Ser. No. 533,265 (D/90244), the disclosure of which is totally incorporated herein by reference, there is disclosed, for example, a process for the preparation of phthalocyanine composites which comprises adding a metal free phthalocyanine, a metal phthalocyanine, a metalloxy phthalocyanine or mixtures thereof to a solution of trifluoroacetic acid and a monohaloalkane; adding to the resulting mixture a titanyl phthalocyanine; adding the resulting solution to a mixture that will enable precipitation of said composite; and recovering the phthalocyanine composite precipitated product.

SUMMARY OF THE INVENTION

It is an object of the present invention to provide processes for the preparation of photogenerating pigments with many of the advantages illustrated herein.

It is a feature of the present invention to provide economically scalable processes for the preparation of photogenerating pigments such as titanyl phthalocyanines, including those of the aforementioned copending applications in some instances, metal free phthalocyanines, metal phthalocyanines, perinones, perylenes, U.S. Pat. No. 4,587,189, the disclosure of which is totally incorporated herein by reference and the like.

Another feature of the present invention relates to the preparation of titanyl phthalocyanine polymorphs, including those known as Type I, Type II, Type III, and Type IV.

Further, another feature of the present invention relates to the preparation of photogenerating pigments, such as titanyl phthalocyanines, by the solubilization thereof.

Moreover, another feature of the present invention relates to the preparation of photogenerating pigments with high purities of, for example, 95 percent in embodiments of the present invention.

Additionally, another feature of the present invention relates to the preparation of photogenerating pigments in acceptable yields of, for example, exceeding about 75 percent in embodiments of the present invention.

Furthermore, another feature of the present invention relates to the preparation of photogenerating pigments including metal free phthalocyanines, metal phthalocyanines, perinones, and perylenes with small average particle diameters, such as, for example, from about 0.05 to about 1 micron in an embodiment of the present invention. Small particle size pigments have the advantage, for example, that they can be selected for a photoresponsive device after dispersion in the coating solution, thus for example circumventing, or avoiding the need for mechanical particle size reduction methods which are lengthy, can be costly and can permit the undesirable degradation of sensitive pigments.

Additionally, in another feature of the present invention there are provided processes for the preparation of photogenerating components which can be recovered in an embodiment with reduced milling time, for example from 5 days to 1 day.

A further specific object of the present invention resides in the provision of an photoresponsive imaging member with an aryl amine hole transport layer, and a photogenerator layer comprised of the pigments obtained by the processes illustrated herein.

These, other objects and features of the present invention are accomplished by the provision of processes for the preparation of photogenerating pigments and photoresponsive imaging members thereof. More specifically, in one embodiment of the present invention there are provided processes for the preparation of metal free phthalocyanines, metal phthalocyanines, perinones, and perylenes, including titanyl phthalocyanine (TiOPc) polymorphs, which comprises the solubilization of the photogenerating pigment in a mixture of trihalo, such as trifluoroacetic acid and toluene, precipitation of the desired pigment, separation by, for example, filtration, and optionally subjecting the product to washing. The product can be identified by various known means including X-ray powder diffraction, XRPD.

One embodiment of the present invention is directed to a process for the preparation of metal free phthalocyanines, metal phthalocyanines, perinones, and perylenes, including benzimidazole, naphthimidazole perinone, benzimidazole perinone, vanadyl phthalocyanine, and titanyl phthalocyanine (TiOPc) which comprises dissolving the photogenerator pigment in a mixture of trifluoroacetic acid and toluene; adding the resulting mixture to a stirred alcohol, such as isopropanol solution, to water, or mixtures thereof; separating the resulting precipitate by, for example, vacuum filtration through, for example, a 4.25 centimeters glass fiber or a 0.2 micron PTFE Millipore filter in a Buchner funnel; and washing the pigment product.

In the embodiments of the present invention there are provided (1) a process for the preparation of photogenerating pigments which comprises adding a pigment to a solution of trihaloacetic acid, such as trifluoroacetic acid and toluene, or other cosolvents such as trihaloacetic acid and dihalo, especially dichloromethane, adding the solution to a stirred mixture of an alcohol and water whereby a precipitate results, and separating the desired photogenerating pigment product from the solution; (2) a process for the preparation of pigments which comprises admixing a pigment with a solution of trifluoroacetic acid and toluene, adding the solution to a stirred mixture of an alcohol and water whereby a precipitate results, and separating the desired photogenerating pigment product from the solution, followed by washing; (3) a process for the preparation of photogenerating pigments which comprises adding a pigment to a solution of trifluoroacetic acid and toluene, adding the solution to a stirred mixture of an alcohol and water whereby a precipitate results, and separating the desired photogenerating pigment product from the solution, which pigment has a particle size diameter of from about 0.05 to about 1 micron; and (4) a process which comprises adding a pigment to a solution of trihaloacetic acid and toluene, adding the solution to a nonsolvent for the pigment, and separating the product from the solution.

Examples of reactants that can be selected in effective amounts include benzimidazole perylene, naphthimidazole naphthalene and phthalocyanines such as metal free phthalocyanine, titanyl phthalocyanine, vanadyl phthalocyanine, and the like. Generally, any typical photogenerating pigment can be selected for admixing with the solution of, for example, trihalofluoroacetic acid and toluene. These pigments can be dissolved in mixtures of trifluoroacetic acid and a cosolvent such as toluene or methylene chloride at effective concentrations from, for example, a saturated solution to 0.01 percent by weight. Concentrations, which were preferred, were in the range of 0.2 to about 2 percent. The particle sizes can be measured by redispersing the product particles with methanol on a metal grid and measuring the particle size directly using a transmission electron microscope.

As solvent mixture examples there can be selected in embodiments of the present invention trihaloacetic acid, and preferably triflororacetic acid and toluene in effective amounts of from, for example, a ratio of 1:3 (pigment:cosolvent of trihaloacetic acid and toluene) with, for example, from about 4 parts of trihalo, such as trifluoroacetic acid by weight to one part cosolvent, to one part trifluoroacetic acid by weight to 10 parts cosolvent. The particle size can be affected in an embodiment by the combination of dissolving solvent and precipitation solvent as well as the rate of addition of the pigment solution into the precipitation solvent.

Subsequent to solubilization with the above solvent mixture and stirring for an effective period of time of, for example, from about 10 minutes to about 48 hours, the resulting mixture in embodiments of the present invention can be added to a solution that will enable precipitation of the desired photogenerating pigment, which solution can be comprised of a single solvent or mixture of solvents of alcohol, such as isopropanol, methanol ethanol, water or a large excess (greater than 10 volumes when compared to the dissolving solution) of toluene, followed by filtration of the photogenerator pigment product, and washing with various solutions of, for example, water or methanol, followed by washing with methanol, deionized water, and methanol. Furthermore, the pigment product can be purified by suspending the pigment product in deionized water in a dialysis bag, commercially available from Spectrum Medical Industries Inc., with a molecular weight cutoff of about 6,000 to 8,000. The pigment in the dialysis bag can then be suspended in a 10 liter tank of deionized water. Agitation can be continued and leaching of trace amounts of the acid, such as trifluoroacetic acid, from the pigment is followed by measuring the conductance of the bath solution. A conductance of less than 5 microsiemens is desired in an embodiment of the present invention. The solid product can then be isolated by filtration. The solid resulting can then be dried by, for example, heating, followed by cooling. The primary purpose of the washings is to remove the last traces of acid, such as trifluoroacetic acid, which can cause undesirable high dark decay for imaging members thereof if present in the final pigment.

In an embodiment of the present invention there is provided a process for the preparation of perylenes, such as benzimidazole perylene, perinones, such as naphthimidazole perinone, and titanyl phthalocyanine, which comprises dissolving these pigments in mixtures of trifluoroacetic acid, and a cosolvent, such as toluene or methylene chloride, at concentrations of from a saturated solution to 0.01 percent by weight. Concentrations which were preferred were in the range of 0.2 to about 2 percent. The particle sizes can be measured by redispersing the particles with methanol on a metal grid and measuring the particle size directly using a transmission electron microscope.

As the cosolvent mixture, in one embodiment there can be selected triflororacetic acid and toluene in effective amounts of from, for example, a ratio of 1:3, a range of trifluoroacetic acid to cosolvent in the range of 4 parts trifluoroacetic acid by weight to one part cosolvent to one part trifluoroacetic acid by weight to 10 parts cosolvent is preferred. The particle size is affected by the combination of dissolving solvent and precipitation solvent as well as the rate of addition of the pigment solution into the precipitation solvent.

Another embodiment of the present invention is directed to a process for the preparation of the titanyl phthalocyanines of the copending applications mentioned herein which comprises, it is believed, the steps as illustrated herein with the primary exception that, for example, there is enabled a titanyl phthalocaynine Type I polymorph, β Type titanyl phthalocyanine, and the like.

Numerous different layered photoresponsive imaging members with the pigments obtained by the processes of the present invention can be fabricated. In one embodiment, thus the layered photoresponsive imaging members are comprised of a supporting substrate, a charge transport layer, especially an aryl amine hole transport layer, and situated therebetween a photogenerator layer comprised of the pigment illustrated herein, and obtained by the process of the present invention. Another embodiment of the present invention is directed to positively charged layered photoresponsive imaging members comprised of a supporting substrate, a charge transport layer, especially an aryl amine hole transport layer, and as a top overcoating a vacuum evaporated photogenerating pigment obtained with the processes of the present invention. Moreover, there is provided in accordance with the present invention an improved negatively charged photoresponsive imaging member comprised of a supporting substrate, a thin adhesive layer, a photogenerating pigment obtained by the processes of the present invention optionally dispersed in a polymeric resinous binder, and as a top layer aryl amine hole transporting molecules dispersed in a polymeric resinous binder.

The photoresponsive imaging members of the present invention can be prepared by a number of methods, the process parameters and the order of coating of the layers being dependent on the member desired. Thus, for example, these imaging members are prepared by deposition of the photogenerator layer on a supporting substrate with an adhesive layer thereon, and subsequently depositing by solution coating the hole transport layer, reference for example U.S. Pat. No. 4,265,900 the disclosure of which is totally incorporated herein by reference. The imaging members suitable for positive charging can be prepared by reversing the order of deposition of photogenerator and hole transport layers.

Imaging members with the photogenerating pigments obtained with the process of the present invention are useful in various electrostatographic imaging and printing systems, particularly those conventionally known as xerographic processes. Specifically, the imaging members of the present invention can be selected for xerographic imaging processes wherein the pigments absorb light of a wavelength of from about 600 nanometers to about 800 nanometers or in a range from about 400 nanometers to about 750 nanometers. In these known processes, electrostatic latent images are initially formed on the imaging member followed by development, and thereafter transfering the image to a suitable substrate.

Moreover, the imaging members of the present invention in embodiments thereof, and depending on the photogenerator pigment selected can be utilized for electronic printing processes with gallium arsenide light emitting diode (LED) arrays which typically function at wavelengths of 660 nanometers.

In one embodiment there is provided a negatively charged photoresponsive imaging member of the present invention comprised of a supporting substrate, in contact therewith an adhesive layer, a dispersion coated layer comprised of titanyl phthalocyanine Type II obtained with the process of the present invention, and a top hole transport layer comprised of N,N'-diphenyl-N,N'-bis(3-methylphenyl)-1,1'-biphenyl-4,4'-diamine dispersed in a polycarbonate resinous binder.

In another embodiment there is provided a positively charged photoresponsive imaging member of the present invention comprised of a substrate. a hole transport layer comprised of N,N'-diphenyl-N,N'-bis(3-methylphenyl)-1,1'-biphenyl-4,4'-diamine dispersed in a polycarbonate resinous binder, and a photogenerator layer applied by dispersion coating, and comprised of benzimidazole perylene, naphthimidazole perinone, titanyl phthalocyanine or vanadyl phthalocyanine with a particle size diameter of from about 0.05 to about 1 micron obtained with the process of the present invention, optionally dispersed in an inactive resinous binder, and wherein each of the aforementioned layers are in contact with each other in the order indicated. A similar imaging member can be provided wherein the hole transport layer is the top layer.

Substrate layers selected for the imaging members of the present invention can be opaque or substantially transparent, and may comprise any suitable material having the requisite mechanical properties. Thus, the substrate may comprise a layer of insulating material including inorganic or organic polymeric materials, such as Mylar a commercially available polymer, Mylar containing titanium, a layer of an organic or inorganic material having a semiconductive surface layer such as indium tin oxide or aluminum arranged thereon, or a conductive material inclusive of aluminum, chromium, nickel, brass or the like. The substrate may be flexible or rigid and many have a number of many different configurations, such as for example a plate, a cylindrical drum, a scroll, an endless flexible belt and the like. The substrate in an embodiment is in the form of a seamless flexible belt. In some situations, it may be desirable to coat on the back of the substrate, particularly when the substrate is a flexible organic polymeric material with an anticurl layer, such as for example polycarbonate materials commercially available as Makrolon.

The thickness of the substrate layer depends on many factors, including economical considerations, thus this layer may be of substantial thickness of, for example, over 3,000 microns; or of minimum thickness providing there are no adverse effects on the system. In one preferred embodiment, the thickness of this layer is from about 75 microns to about 300 microns.

With further regard to the imaging members, the photogenerator layer is preferably comprised of 100 percent of the pigments obtained with the processes of the present invention, which pigments may be optionally dispersed in resinous binders. Generally, the thickness of the photogenerator layer depends on a number of factors including the thicknesses of the other layers, and the amount of photogenerator material contained in this layer. Accordingly, this layer can be of a thickness of from about 0.05 micron to about 10 microns when the photogenerator composition is present in an amount of from about 5 percent to about 100 percent by volume. Preferably, this layer is of a thickness of from about 0.25 micron to about 1 micron, when the photogenerator composition is present in this layer in an amount of 30 percent by volume. In one very specific preferred embodiment, the dispersion coated photogenerating layers are of a thickness of from about 0.07 micron to about 5 microns, and preferably from about 0.4 to about 1.0 micron. The maximum thickness of this layer is dependent primarily upon factors such as photosensitivity, dark decay, electrical properties and mechanical considerations.

Illustrative examples of polymeric binder resinous materials that can be selected for the photogenerator pigment include those polymers as disclosed in U.S. Pat. No. 3,121,006, the disclosure of which is totally incorporated herein by reference, polyesters, polyvinyl butyral, Formvar ®, polycarbonate resins, polyvinyl carbazole, epoxy resins, phenoxy resins, especially the commercially available poly(hydroxyether) resins, and the like.

As adhesives there can be selected various known substances inclusive of polyesters such as those commercially available from E.I. DuPont as 49,000 polyesters. This layer is usually of a thickness of from about 0.05 micron to 1 micron.

Aryl amines selected for the hole transporting layer which generally is of a thickness of from about 5 microns to about 75 microns, and preferably of a thickness of from about 10 microns to about 40 microns, include molecules of the following formula:

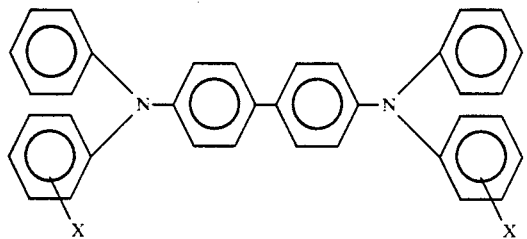

dispersed in a highly insulating and transparent organic resinous binder wherein X is an alkyl group or a halogen, especially those substituents selected from the group consisting of (ortho) $CH_3$, (para) $CH_3$, (ortho) Cl, (meta) Cl, and (para) Cl.

Examples of specific aryl amines are N,N'-diphenyl-N,N'-bis(alkylphenyl)-1,1-biphenyl-4,4'-diamine wherein alkyl is selected from the group consisting of methyl such as 2-methyl, 3-methyl and 4-methyl, ethyl, propyl, butyl, hexyl, and the like. With chloro substitution, the amine is N,N'-diphenyl-N,N'-bis(halo phenyl)-1,1'-biphenyl-4,4'-diamine wherein halo is 2-chloro, 3-chloro or 4-chloro. Other known hole transports may be selected in an embodiment of the present invention.

Examples of the highly insulating and transparent resinous material or inactive binder resinous material for the transport layers include materials such as those described in U.S. Pat. No. 3,121,006, the disclosure of which is totally incorporated herein by reference. Specific examples of organic resinous materials include polycarbonates, acrylate polymers, vinyl polymers, cellulose polymers, polyesters, polysiloxanes, polyamides, polyurethanes and epoxies as well as block, random or alternating copolymers thereof. Preferred electrically inactive binders are comprised of polycarbonate resins having a molecular weight of from about 20,000 to about 100,000 with a molecular weight of from about 50,000 to about 100,000 being particularly preferred. Generally, the resinous binder contains from about 10 to about 75 percent by weight of the active material corresponding to the foregoing formula, and preferably from about 35 percent to about 50 percent of this material.

Also, included within the scope of the present invention are methods of imaging and printing with the photoresponsive devices illustrated herein. These methods generally involve the formation of an electrostatic latent image on the imaging member, followed by developing the image with a toner composition, subsequently transferring the image to a suitable substrate, and permanently affixing the image thereto. In those environments wherein the device is to be used in a printing mode, the imaging method involves the same steps with the exception that the exposure step can be accomplished with a laser device or image bar.

The invention will now be described in detail with reference to specific preferred embodiments thereof, it being understood that these examples are intended to be illustrative only. The invention is not intended to be limited to the materials, conditions, or process parameters recited herein, it being noted that all parts and percentages are by weight unless otherwise indicated.

EXAMPLE I

Particle Size Reduction of Benzimidazole Perylene

Sublimed Benzimidazole Perylene (BzP) (4.0 grams) was suspended in toluene (150 milliliters) and trifluoroacetic acid (50 milliliters) and stirred magnetically at ambient temperature for 1.5 hours. After filtration through a 0.2 micron PTFE filter (no undissolved BzP), the filtrate was added dropwise to 1.5 liters of toluene. The precipitate was isolated by filtration. The particle size was substantially reduced to the submicron level. Residual traces of trifluoroacetic acid were removed by dialysis with deionized water (recovery 3.9 grams, 98 percent). The final particle size (average diameter) of benzimidazole perylene was about 0.01 micron to about 0.2 micron as determined by TEM (transmission electron microscopy).

EXAMPLE II

Particle Size Reduction of Naphthimidazole Perinone

Naphthimidazole Perinone (2.091 grams) was suspended in toluene (235 milliliters) and trifluoroacetic acid (78 milliliters) and stirred magnetically at ambient temperature overnight (18 hours). On filtration through a 0.2 micron PTFE filter, 1.502 grams (72 percent) of undissolved NPN was recovered. Addition of the solution to isopropanol (1 liter) provided an immediate precipitate. Isolation, dialysis and isolation of the pigment provided 0.396 gram of NPN (19 percent). The final particle size (average diameter) of the product NPN perinone was about 0.05 micron to about 0.1 micron as determined by TEM (transmission electron microscopy).

EXAMPLE III

Particle Size Reduction of Titanyl Phthalocyanine Type II

Titanyl phthalocyanine (2.118 grams), was suspended in toluene (80 milliliters) and trifluoroacetic acid (250 milliliters) and stirred magnetically for 18 hours at ambient temperature. After filtration through a 0.5 micron PTFE filter (recovery 0.407 gram, 19.2 percent), the green solution was added dropwise to 1 liter of isopropanol and the precipitate was isolated in a Buchner funnel. After reslurrying in THF (200 milliliters, 4 hours), the residual trifluoroacetic acid was removed by dialysis and the blue pigment dried to constant weight (1.213 grams, 57.3 percent). The final particle (average diameter) size of the titanyl phthalocyanine photogenerating Type II was about 0.05 microns to about 0.1 micron as determined by TEM.

EXAMPLE IV

Device Fabrication For Benzimidazole Perylene

An example of the electrical properties of the particle size-reduced pigment is illustrated below by benzimidazole perylene photogenerating pigment prepared as described in Example I.

A photoresponsive imaging member was prepared by providing a titanized Mylar substrate in a thickness of 75 microns, followed by applying thereto with a multiple clearance film applicator in a wet thickness of 12.5 microns, and thereover a layer of N-methyl-3-aminopropyl trimethoxysilane, available from PCR Research Chemicals, Florida, in ethanol in a 1:20 volume ratio. This layer was then allowed to dry for 5 minutes at room temperature, followed by curing for 10 minutes at 110° C. in a forced air oven.

There was then applied to the above silane layer 0.05 percent by weight of an adhesive available from DuPont Chemicals as 49,000 polyester in methylene chloride and 1,1,2-trichloroethane (4:1 volume ratio) with a multiple clearance film applicator to a wet thickness of 12.5 microns. This layer was allowed to dry for one minute at room temperature and 10 minutes at 100° C. in a forced air oven. The resulting layer had a dry thickness of 0.05 micron. With a multiple clearance film applicator, a dispersion of 80 percent by weight of the benzimidazole perylene pigment obtained from the process of Example I and 20 percent by weight of polyvinyl carbazole (4.4 weight percent solids) in methylene chloride was the applied to then adhesive layer.

Thereafter, the above photogenerating layer was overcoated with an amine hole transport layer prepared as follows:

A hole layer with 65 percent by weight Makrolon, a polycarbonate resin, was mixed with 35 percent by weight of N,N'-diphenyl-N,N'-bis(3-methylphenyl)-1,1'-biphenyl-4,4'-diamine to 19 percent by weight in methylene chloride in an amber bottle. The resulting mixture was then coated in a dry thickness of 20 microns on top of the above photogenerating layer using a multiple clearance film applicator (10 mils wet gap thickness). The resulting member was then dried in a forced air oven at 135° C. for 20 minutes.

The photosensitivity of this member was then determined by electrostatically charging the surface thereof with a corona discharge source until the surface potential as measured by a capacitively coupled probe attached to an electrometer attained an initial dark value $V_o$ of $-800$ volts. The front surface of the charged member was then exposed to light from a filtered Xenon lamp, XBO 75 watt source, allowing light in the wavelength range 400 to 700 nanometers to reach the member surface. The exposure causing reduction of the surface potential to half its initial value, $E_{\frac{1}{2}}$, and the percent discharge of surface potential due to various exposure energies was then determined. The photosensitivity can be determined in terms of the exposure in ergs/cm$^2$ necessary to discharge the member from the initial surface potential to half that value. The higher the photosensitivity, the smaller the exposure energy required to discharge the layer to 50 percent of the surface potential. At 400 to 700 nanometers exposure, the electrical performance of this photoreceptor was excellent as ilustrated below, and stable for about 100,000 imaging cycles.

BzP Prepared as in Example I

Sublimed BzP reprecipitated from TFA-Toluene
Milling time: 1 day
Device: Mod V/80 wt percent BzP in PVK/20 um 35 percent m-TBD in
Makrolon
Dark Decay (Volts/sec): 18 V/sec
10 erg Discharge: 83 percent
$E_{\frac{1}{2}}(400-700$ nm): 3.6 ergs/cm$^2$
$V_{ddp}$: $-825$ V
Corotron Voltage: $-5.30$ The above imaging member was prepared with the exception that the photogenerating pigment was subjected to ball milling for 1 day, and the sensivity of the resulting imaging member was 8 erg/centimeter.

Other modifications of the present invention may occur to those skilled in the art based upon a review of the present disclosure application and these modifications, including equivalents thereof, are intended to be included within the scope of the present invention.

What is claimed is:

1. A process for the preparation of a titanyl phthalocyanine photogenerating pigment consisting essentially of dissolving said pigment in a solution of trihaloacetic acid and toluene; adding the solution to a nonsolvent of toluene, an alcohol, water, or a mixture of water and an alcohol for the pigment whereby a precipitate of said pigment results; and separating the precipitated titanyl phthalocyanine from the solution, which titanyl phthalocyanine has a particle size diameter of from between about 0.05 micron to about 1 micron.

2. A process in accordance with claim 1 wherein the trihaloacteic acid is trifluoroacetic acid.

3. A process in accordance with claim 2 wherein there is selected a 1:4 ratio mixture of trifluoroacetic acid and toluene.

4. A process in accordance with claim 2 wherein the resulting product is dried by heating at a temperature of from about 20° C. to about 70° C.

5. A process in accordance with claim 2 wherein the resulting precipitate is dried by heating at a temperature of from about 20° C. to about 70° C. for a period of from about 5 to about 15 hours.

6. A process in accordance with claim 2 wherein washing of the product is accomplished.

7. A process in accordance with claim 2 wherein washing of the product is accomplished with a solution of water and an alcohol.

8. A process in accordance with claim 1 wherein the alcohol is is propanol.

9. A process in accordance with claim 1 wherein the pigment product is titanyl phthalocyanine polymorph II.

10. A process in accordance with claim 1 wherein the resulting product is dried by heating.

11. A process in accordance with claim 1 wherein washing of the product is accomplished.

12. A process in accordance with claim 1 wherein washing of the product is accomplished with a solution of water and an alcohol.

13. A process for the preparation of titanyl phthalocyanine pigments consisting essentially of dissolving said titanyl phthalocyanine in solution of trihaloacetic acid and toluene; adding the solution to a nonsolvent of toluene, an alcohol, water, or a mixture of water and an alcohol for the titanyl phthalocyanine whereby a precipitate titanyl phthalocyanine results; and separating the desired titanyl phthalocyanine photogenerating pigment product from the solution by filtration and wherein the average particle diameter of the titanyl phthalocyanine product is from about 0.05 micron to about 1 micron.

14. A process in accordance with claim 13 wherein the trihaloacteic acid is trifluoroacetic acid.

15. A process in accordance with claim 13 wherein the alcohol is propanol.

16. A process in accordance with claim 13 wherein the pigment product is titanyl phthalocyanine polymorph II.

17. A process in accordance with claim 13 wherein there is obtained titanyl phthalocyanine with an average particle size diameter of from about 0.05 to about 1 micron.

18. A process in accordance with claim 13 wherein there is obtained titanyl phthalocyanine Type II with an average particle diameter of from about 0.05 micron to about 0.1 micron.

19. A process for the preparation of titanyl phthalocyanine photogenerating pigments consisting essentially of dissolving said pigment in a solution of trifluoroacetic acid and toluene; adding the solution to a nonsolvent of toluene, an alcohol, water, or a mixture of water and an alcohol for the pigment whereby a precipitate results; and separating the desired photogenerating pigment product from the solution by filtration and wherein the titanyl phthalocyanine has a particle diameter of from about 0.05 micron to about 1 micron.

20. A process for the preparation of titanyl phthalocyanine photogenerating pigments consisting essentially of dissolving said titanyl phthalocyanine in a solution of trifluoroacetic acid and toluene; adding the solution to a stirred mixture of an alcohol and water whereby a precipitate results; and separating the desired photogenerating titanyl phthalocyanine pigment product from the solution by filtration and wherein the titanyl phthalocyanine has a particles diameter of from about 0.05 micron to about 1 micron.

21. A process in accordance with claim 20 wherein subsequent to filtration the titanyl phthalocyanine is subjected to washing.

22. A process in accordance with claim 21 wherein washing is accomplished with a solution of water and an alcohol.

23. A process in accordance with claim 22 wherein washing is accomplished with 20 milliliter of 1:1 (v/v) water/isopropanol; $3 \times 10$ milliliter portions of isopropanol; $3 \times 5$ milliliter portions of deionized water, and $2 \times 5$ milliliter portions of isopropanol.

24. A process for the preparation of titanyl phthalocyanine photogenerating pigments consisting essentially of dissolving said titanyl phthalocyanine in a solution of trifluoroacetic acid and toluene; adding the solution to an alcohol, water, or toluene, whereby a precipitate results; and separating the desired photogenerating titanyl phthalocyanine pigment product from the solution by filtration, which pigment has a particle size diameter of from about 0.05 to about 1 micron.

25. A process in accordance with claim 24 wherein there is obtained titanyl phthalocyanine polymorph II.

* * * * *